May 24, 1938.    W. G. FARR    2,118,076
SURFACING STRUCTURE AND METHOD FOR MAKING SAME
Filed Feb. 28, 1935
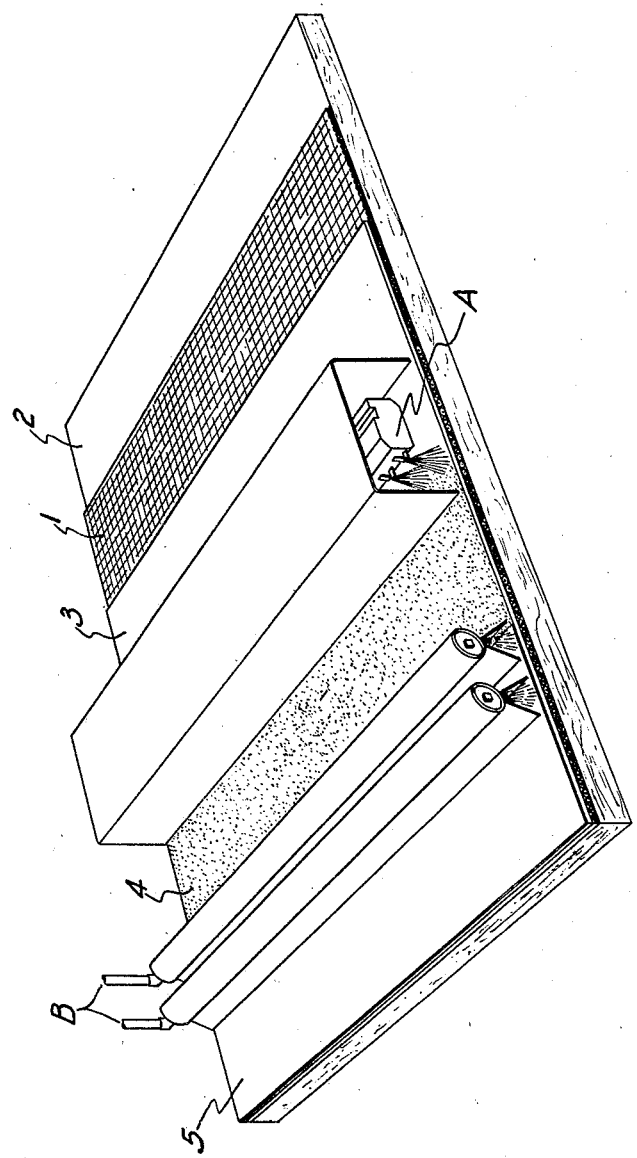
INVENTOR
WALTER G. FARR
BY
*Gordon C. Willard*
ATTORNEY Patented May 24, 1938

2,118,076

UNITED STATES PATENT OFFICE 2,118,076

SURFACING STRUCTURE AND METHOD FOR MAKING SAME

Valter G. Farr, South Orange, N. J., assignor to Congoleum-Nairn Inc., a corporation of New York Application February 28, 1935, Serial No. 8,583

15 Claims. (Cl. 154—49)

The present invention relates to smooth surface coverings of linoleum, felt base or the like and more particularly to floor and wall surfacing structures of the type described and claimed in Patent #1,970,503, granted August 14, 1934, to A. W. Hawkes and R. D. Bonney, such surfacing structures being characterized by a cementitious layer on the back thereof and being ready-to-lay in bonded relation to a sub-surface without the employment of additional paste or cement.

Pre-formed floor surfacing structures of the type referred to comprise in composite form a body portion having a wearing or ornamental surface, in combination with a layer of cementitious material applied to the back or lower face of the body portion and adapted to bond the body portion to a sub-surface which is to be protected or decorated. As a more specific example such floor surfacing structure may comprise a body portion consisting of a strain-resisting foundation member having on one face a surfacing layer and on the other face such a layer of cementitious material. The surfacing layer of the body portion may be wear-resisting or ornamental or both and may be of paint, linoleum, or equivalent composition constituting a layer carried upon and integral with one side of the foundation member. The foundation member is preferably a sheet-like material suitable as a backing for the surfacing composition, as for example, burlap, cotton sheeting, impregnated felt, or a combination of dry or impregnated felt and a woven fabric, to the end that the foundation member will be resistant to tearing and stretching. The cementitious material may be of a normally non-sticky, non-tacky character but adapted to be activated, as by the application of an appropriate solvent, to impart adhesive properties thereto.

Among the suitable cementitious materials of the solvent activated type, adhesives which are adapted to be activated by the application of water are to be preferred for numerous reasons. The foremost advantage is the ready availability of water in any desired amount for activation of the adhesive, whereas in the case of special adhesives and special activating solvents it is necessary to supply the correct amount of such solvent with each unit of surface covering. Furthermore, the fire hazard and the disagreeable odor, both of which accompany the use of special organic solvents, are avoided.

One suitable type of water activated cementitious material comprises a mixture of clay and lignin with the addition of a plasticizing agent such as glycerine. A typical formula for such adhesive is clay 55%, lignin 42%, and glycerine 3%. The term "lignin" refers to an article of commerce obtained by evaporation of waste sulphite liquors from the wood pulp industry. The cement may be prepared for application to the back of the surface covering by forming a paste consisting of three to four parts of the above clay-lignin-glycerine mixture and one part of water. Following the application of this paste to the back of the surface covering the water is caused to evaporate leaving a dry, non-sticky, and non-tacky layer of the adhesive. Such cementitious material is readily activated upon application of a substantial quantity of water, possesses high bonding strength when activated, and hardens upon evaporation of the water to form a relatively rigid or semi-rigid bond between the surface covering and the sub-surface.

Under ordinary conditions of storing, shipping, and merchandising floor and wall coverings of this type, the cementitious material above described is substantially unaffected by normal temperature and humidity variations and requires no protection. It is not infrequent, however, that in warehousing or distributing such coverings there may occur abnormal atmospheric conditions such as excessively high humidity, which, if continued for a period, will soften the adhesive layer and prematurely render it sticky. My invention contemplates an improved surface covering of the type described in which this hazard is overcome and wherein the cementitious layer is provided with a protective film of a moisture repellent composition which materially retards the absorption by the adhesive of moisture from the air under abnormal conditions of excessive humidity, and which forms a flexible coating over the surface of the adhesive that remains non-sticky even though the adhesive becomes softened by continued exposure to abnormal humidity conditions, yet which is easily broken down upon the application of a substantial quantity of water to permit rapid and complete activation of the adhesive when the surface covering is to be installed. My invention further contemplates an improved method of applying such protective film to the adhesive layer, which method comprises the steps of first applying to the cementitious material an adherent deposit of the discrete solid particles of the protective composition and thereafter fluxing such discrete particles with heat to fuse them together and to form a substantially uniform film of ultra thinness.

One preferred embodiment of my invention comprises a floor or wall surfacing structure of the general type above described having a layer of water activated cementitious material integral with the back thereof, such adhesive layer being coated with a protective film, not substantially greater than .0004 inch in thickness, and consisting of a composition comprising a water-insoluble organic material, e. g., paraffine wax. The preferred protective coating composition employed in this embodiment of my invention comprises a low melting point paraffine wax and a mineral oil. The proportion of mineral oil may be varied depending upon its viscosity and upon the desired melting point of the final composition. To facilitate application of the protective coating and for other practical advantages I have found it desirable to add to the paraffine wax sufficient mineral oil to yield a composition having a melting point between 100° F. and 120° F. One satisfactory composition comprises five parts of a paraffine wax known as "crude scale wax" having a melting point of 123° F. and one part of a mineral motor oil of S. A. E. 30 viscosity. This composition has a melting point of approximately 105° F.

The improved method of applying the protective coating comprises first melting the composition, dispersing the molten mass into tiny globules under such conditions that they quickly freeze or solidify, and depositing the discrete solidified particles upon the adhesive layer to be protected. The dispersion, solidification, and deposition of the solid discrete particles of the protective composition may be readily effected by means of an air spray and one suitable type of equipment for carrying out this part of my invention is described in U. S. Patent #1,592,100 granted July 13, 1926. By this method and with such equipment the amount of protective coating composition per unit area can be limited to a very low quantity while obtaining substantially uniform distribution. The adherent deposit of discrete particles of the solidified paraffine-oil composition thus obtained is, however, non-continuous and of no value as a protective film. The final step in my improved method, therefore, consists in applying heat to such deposit of discrete particles to reduce the composition again to the liquid phase and to cause it to spread over the surface of the adhesive whereby a substantially uniform and ultra thin protective film is obtained which completely coats the cementitious layer. The liquification of the discrete particles of wax-oil composition is most easily accomplished by the direct application of heat to the particles as by means of a gas flame or radiant heater. After the protective composition fuses and spreads to uniformly coat the adhesive layer, it may be re-solidified by a blast of cool air.

I have found that the ultimate protective film of moisture repellent composition should preferably be of a thickness of approximately .0001 of an inch and for practical purposes not substantially outside the range of .0004 to .00004 of an inch. Films of less thickness do not provide adequate protection of the adhesive layer under abnormal humidity conditions while films of substantially greater thickness impede the activation of the adhesive when the surface covering is to be installed. To obtain a protective film of the preferred thickness the amount of protective coating composition applied should be controlled within the limits of .0015 to .015 pound per square yard and preferably should approximate .004 pound per square yard. In this connection I have found that it is impossible, by any practicable method, to obtain a substantially continuous and uniform film of such ultra thinness by a spray application of a solution of the wax-oil composition. The high cost of the very large amount of solvent required for the deposition of such a minimum quantity of wax, and the high cost of equipment for safe removal of explosive vapor are prohibitive factors.

The accompanying drawing illustrates one embodiment of my product invention and pictures diagrammatically a method of producing such product. The figure is a perspective view with sections broken away to show the laminated structure of my improved product. Referring to the drawing the numeral 1 indicates the base web or strain-resisting foundation member, as for example burlap, of my improved surface covering. On one side of the base web is a wear-resisting or ornamental drying oil composition such as linoleum, indicated by the numeral 2. Upon the back or opposite side of the foundation member is a layer of cementitious material 3 integral therewith, such cementitious material being of the water-activated type above described. In applying the protective film the surface covering is conveyed beneath a spray device "A" of the type heretofore referred to. The spray device uniformly applies to the cementitious material 3 an adherent deposit of discrete solid particles 4 of the paraffine wax-oil composition. The surface covering is then passed beneath a gas flame "B" where the discrete particles are fused and spread to form an ultra thin but substantially uniform film 5 completely coating the adhesive layer 3.

The moisture repellent character of the protective coating, the ultra thinness of the film thereof, and the manner of applying the film to the cementitious layer, are all essential features of my invention. By the preparation of a composition of the type above described and by controlling the thinness of the film, I provide a protective coating for the adhesive layer which strongly resists the absorption of moisture from the air during periods of excessive humidity and which keeps the surface of the adhesive layer non-sticky even though the adhesive may become somewhat softened from continued exposure to highly humid air. Yet, in spite of the protection thus afforded, the film is easily broken down upon the application of a substantial quantity of water thus permitting the adhesive to be quickly and thoroughly activated when the surface covering is to be installed.

Modifications in the practice of my invention will undoubtedly suggest themselves to those skilled in the art and I do not wish to limit the scope of the same except as defined in the appended claims.

I claim:—

1. As a new article of manufacture a preformed surfacing structure for floors or walls ready-to-lay in bonded relation to a sub-surface comprising a body portion one face of which constitutes a wearing surface; a layer of normally non-sticky cementitious material integral with the opposite face of said body portion and adapted to be activated with water to impart thereto adhesiveness to bond the body portion to the sub-surface to which it may be applied; and a protective film, consisting of a composition comprising paraffine wax in major proportion having a melting point between 100° F. and 120° F., coating said cementitious material and adapted to resist the absorption of moisture by the cementitious material under abnormal humidity conditions and being of such thinness as to be easily broken down when it is desired to activate the cementitious material with water.

2. As a new article of manufacture pre-formed surfacing structure of the character herein described for floors or walls ready-to-lay in bonded relation to a sub-surface comprising a body portion one face of which constitutes a wearing surface; a layer of normally non-sticky cementitious material integral with the opposite face of said body portion and adapted to be activated with water to impart thereto adhesiveness to bond the body portion to the sub-surface to which it may be applied; and a protective film, not substantially greater than .0004 inch in thickness, consisting essentially of a water insoluble and moisture repellent organic composition having a melting point between 100° F. and 120° F., coating said cementitious material and adapted to resist the absorption of moisture by the cementitious material under abnormal humidity conditions and to be easily broken down upon the application of a substantial quantity of water thus permitting the cementitious material to be quickly and thoroughly activated when the surfacing structure is to be installed.

3. As a new article of manufacture a pre-formed surfacing structure of the character herein described for floors or walls ready-to-lay in bonded relation to a sub-surface comprising a body portion one face of which constitutes a wearing surface; a layer of normally non-sticky cementitious material integral with the opposite face of said body portion and adapted to be activated with water to impart thereto adhesiveness to bond the body portion to the sub-surface to which it may be applied; and a protective film, not substantially greater than .0004 inch in thickness, consisting of a composition comprising paraffine wax in a major proportion and a mineral oil and having a melting point between 100° F. and 120° F., coating said cementitious material and adapted to resist the absorption of moisture by the cementitious material under abnormal humidity conditions and to be easily broken down upon the application of a substantial quantity of water thus permitting the cementitious material to be quickly and thoroughly activated when the surfacing structure is to be installed.

4. As a new article of manufacture a pre-formed surfacing structure of the character herein described for floors or walls ready-to-lay in bonded relation to a sub-surface comprising a body portion one face of which constitutes a wearing surface; a layer of normally non-sticky cementitious material integral with the opposite face of said body portion and adapted to be activated with water to impart thereto adhesiveness to bond the body portion to the sub-surface to which it may be applied; and a protective film containing in major proportion an organic water insoluble and moisture repellent material solid at normal temperature and not substantially greater than .0004 inch in thickness, said film being disposed as a coating upon the outer surface of said cementitious material and being adapted to resist the absorption of moisture by the cementitious material under abnormal humidity conditions and being adapted to be easily broken down upon the application of a substantial quantity of water thus permitting the cementitious material to be quickly and thoroughly activated when the surfacing structure is to be installed.

5. As a new article of manufacture a pre-formed surfacing structure of the character hereing described for floors or walls ready-to-lay in bonded relation to a sub-surface comprising a body portion one face of which constitutes a wearing surface; a layer of normally non-stick cementitious material integral with the opposite face of said body portion and adapted to be activated with water to impart thereto adhesiveness to bond the body portion to the sub-surface to which it may be applied; and a protective film consisting of a water insoluble and moisture repellent composition and containing a major proportion of wax, said film being disposed as a coating upon the outer surface of said cementitious material and being adapted to resist the absorption of moisture by the cementitious material under abnormal humidity conditions and being of such thinness as to be easily broken down upon the application of a substantial quantity of water thus permitting the cementitious material to be quickly and thoroughly activated when the surfacing structure is to be installed.

6. As a new article of manufacture a pre-formed surfacing structure of the character herein described for floors or walls ready-to-lay in bonded relation to a sub-surface comprising a body portion one face of which constitutes a wearing surface; a layer of normally non-sticky cementitious material integral with the opposite face of said body portion, said cementitious material comprising lignin, clay and a plasticizing agent and adapted to be activated with water to impart thereto an adhesiveness to bond the body portion to the sub-surface to which it may be applied; and a protective film, not substantially greater than .0004 inch in thickness, consisting of a composition comprising a major proportion of wax and having a melting point between 100° F. and 120° F., coating said cementitious material and adapted to resist the absorption of moisture by the cementitious material under abnormal humidity conditions and adapted to be easily broken down upon the application of a substantial quantity of water thus permitting the cementitious material to be quickly and thoroughly activated when the surfacing structure is to be installed.

7. As a new article of manufacture a pre-formed surfacing structure of the character described for floors or walls ready-to-lay in bonded relation to a sub-surface comprising a body portion one face of which constitutes a wearing surface; a layer of normally non-sticky cementitious material integral with the opposite face of said body portion, said cementitious material comprising lignin, clay and a plasticizing agent and adapted to be activated with water to impart thereto an adhesiveness to bond the body portion to the sub-surface to which it may be applied; and a protective film consisting essentially of a water insoluble and moisture repellent organic composition solid at normal temperatures and not substantially greater than .0004 inch in thickness, said film being disposed as a coating upon the outer surface of said cementitious material and being adapted to resist the absorption of moisture by the cementitious material under abnormal humidity conditions and being adapted to be easily broken down upon the application of a substantial quantity of water thus permitting the cementitious material to be quickly and thoroughly activated when the surfacing structure is to be installed.

8. As a new article of manufacture a pre-formed surfacing structure of the character herein described for floors and walls ready-to-lay in bonded relation to a sub-surface comprising a body portion characterized by a sheet-like strain-resistant foundation member and a surface layer of linoleum composition on one side of said foundation member constituting the upper or wearing surface; a layer of normally non-sticky cementitious material integral with said body portion and adapted to be activated by water to impart thereto an adhesiveness to bond the body portion to the sub-surface to which it may be applied; and a protective film consisting essentially of a water-insoluble and moisture repellent organic composition solid at normal temperature, said film being disposed as a coating upon the outer surface of said cementitious material and being adapted to resist the absorption of moisture by the cementitious material under abnormal humidity conditions and being of such thinness as to be easily broken down upon the application of a substantial quantity of water thus permitting the cementitious material to be quickly and thoroughly activated when the surfacing structure is to be installed.

9. As a new article of manufacture a preformed surfacing structure for floors and walls ready-to-lay in bonded relation to a sub-surface comprising a body portion characterized by a sheet-like strain-resistant foundation member and a surface layer of linoleum composition on one side of said foundation member constituting the upper or wearing surface; a layer of normally non-sticky cementitious material integral with said body portion and adapted to be activated by water to impart thereto an adhesiveness to bond the body portion to the sub-surface to which it may be applied; and a protective film, not substantially greater than .0004 inch in thickness, consisting of a composition comprising paraffine wax in major proportion and having a melting point between 100° F. and 120° F., coating said cementitious material and adapted to resist the absorption of moisture by the cementitious material under abnormal humidity conditions but to be easily broken down when it is desired to activate the cementitious material with water.

10. In a method of making a surfacing structure of the character herein described comprising a body portion of which one face constitutes a wearing surface, and a layer of normally substantially non-sticky cementitious material preformed in integral relation with the opposite face of said body portion and adapted to be activated with water to impart thereto adhesiveness for bonding said body portion to a subsurface, the steps comprising applying said cementitious material to said body portion when mixed with sufficient water to afford a sticky spreadable mass, causing said cementitious material to dry to a substantially non-sticky condition, and then coating said cementitious material with a protective film of organic water-insoluble and moisture repellent meltable material solid at normal temperatures by spraying the material in a melted condition, depositing particles of the sprayed material on said cementitious material, and subjecting the particles deposited on said cementitious material to heat to cause the deposited particles to coalesce and to become more uniformly spread over the cementitious material, thereby producing a protective film of water-insoluble material adapted to resist absorption of moisture by the cementitious material under abnormal humidity conditions, said film being deposited in such thinness as to be easily broken down upon the application of a substantial quantity of water thus permitting the cementitious material to be quickly and thoroughly activated when the surfacing structure is to be installed.

11. In a method of making a surfacing structure of the character herein described comprising a body portion of which one face constitutes a wearing surface, and a layer of normally non-sticky cementitious material preformed in integral relation with the opposite face of said body portion and adapted to be activated with water to impart adhesiveness for bonding said body portion to a subsurface, the steps comprising forming the said structure having said layer of cementitious material, and coating said layer of cementitious material with a protective film of water-insoluble and moisture repellent material containing a major proportion of wax solid at normal temperatures by spraying the material in a melted condition, depositing particles of the sprayed material on the cementitious material and subjecting the particles deposited on the cementitious material to heat to cause the particles to coalesce and to become more uniformly spread over the cementitious material, the water-insoluble material being deposited on said cementitious material in such quantity that the resulting film of water-insoluble material is approximately .00004 to approximately .0004 inch in thickness, thereby producing a protective film of said water-insoluble material adapted to resist absorption of moisture from the atmosphere by the cementitious material and adapted to be easily broken down upon the application of a substantial quantity of water thus permitting the cementitious material to be quickly and thoroughly activated when the surfacing structure is to be installed.

12. As a new article of manufacture, a preformed surfacing structure of the character herein described for floors or walls and ready-to-lay in bonded relation to a subsurface, comprising a body portion of which one face constitutes a wearing surface, a layer of normally substantially non-sticky cementitious material integral with the opposite face of said body portion and adapted to be activated with water to impart thereto adhesiveness for bonding said body portion to a subsurface, and a protective film containing in major proportion a substantially water-insoluble and moisture repellent organic material, said film being disposed as a coating upon the outer surface of said layer of cementitious material and being adapted to resist absorption of moisture from the atmosphere by said cementitious material and being of such thinness as to be easily broken down upon the application of a substantial quantity of water thus permitting the cementitious material to be quickly and thoroughly activated when the surfacing structure is to be installed.

13. An article of manufacture of the character herein described comprising a body portion, a layer of normally non-sticky cementitious material integral with one face of said body portion and adapted to be activated with water to impart adhesiveness thereto for bonding said body portion to a subsurface and a substantially water-insoluble and moisture repellent protective film containing a major proportion of water-insoluble and moisture repellent organic material solid at normal temperatures, said film being disposed as a coating upon the outer surface of said cementitious material and being adapted to resist absorption of moisture from the atmosphere by the cementitious material and being of such thinness as to be easily broken down upon the application of a substantial quantity of water thus permitting the cementitious material to be quickly and thoroughly activated when the surfacing structure is to be installed.

14. As a new article of manufacture a preformed surfacing structure of the character herein described for floors and walls ready-to-lay in bonded relation to a sub-surface comprising a body portion characterized by a sheetlike strain-resistant foundation member and a surface layer of linoleum composition on one side of said foundation member constituting the upper or wearing surface; a layer of normally non-sticky cementitious material integral with the opposite face of said body portion, and adapted to be activated with water to impart thereto an adhesiveness to bond the body portion to the sub-surface to which it may be applied; and a protective film consisting of a meltable water insoluble and moisture repellent organic composition coating said cementitious material and adapted to resist the absorption of moisture by the cementitious material under abnormal humidity conditions, and being of such thinness as to be easily broken down upon the application of a substantial quantity of water thus permitting the cementitious material to be quickly and thoroughly activated when the surfacing structure is to be installed, said water-insoluble and moisture repellent composition in said film being in the form of a multiplicity of particles fused together.

15. As a new article of manufacture a preformed surfacing structure of the character herein described for floors and walls ready-to-lay in bonded relation to a sub-surface comprising a body portion characterized by a sheetlike strain-resistant foundation member and a surface layer of linoleum composition on one side of said foundation member constituting the upper or wearing surface; a layer of normally non-sticky cementitious material integral with the opposite face of said body portion, and adapted to be activated with water to impart thereto an adhesiveness to bond the body portion to the sub-surface to which it may be applied; and a protective film, not substantially greater than .0004 inch in thickness, consisting of a water-insoluble moisture repellent composition containing a major proportion of wax having a melting point between 100° F. and 120° F. coating said cementitious material and adapted to resist the absorption of moisture by the cementitious material under abnormal humidity conditions and adapted to be easily broken down upon the application of a substantial quantity of water thus permitting the cementitious material to be quickly and thoroughly activated when the surfacing structure is to be installed, said water-insoluble and moisture repellent composition in said film being in the form of a multiplicity of particles fused together.

WALTER G. FARR.